US 6,663,441 B1

(12) United States Patent
Alexandre et al.

(10) Patent No.: US 6,663,441 B1
(45) Date of Patent: Dec. 16, 2003

(54) ELECTRIC SWITCH APPLIANCE AND QUICK-ASSEMBLY

(75) Inventors: Pascal Alexandre, Arceau (FR); Serge Paggi, Ruffey les Echirey (FR)

(73) Assignee: Schneider Electric Industries SA (FR)

( * ) Notice: Subject to any disclaimer, the term of this patent is extended or adjusted under 35 U.S.C. 154(b) by 0 days.

(21) Appl. No.: 09/889,884

(22) PCT Filed: Jan. 31, 2000

(86) PCT No.: PCT/FR00/00223

§ 371 (c)(1),
(2), (4) Date: Jul. 24, 2001

(87) PCT Pub. No.: WO00/46880

PCT Pub. Date: Aug. 10, 2000

(30) Foreign Application Priority Data

Feb. 5, 1999 (FR) .............................................. 99 01534

(51) Int. Cl.[7] ................................................ H01R 9/22
(52) U.S. Cl. ...................................... 439/715; 439/828
(58) Field of Search ................................. 439/715, 828

(56) References Cited

U.S. PATENT DOCUMENTS

| 3,253,252 A | * | 5/1966 | Piperato et al. ............. 439/717 |
| 4,469,393 A | * | 9/1984 | Chewning et al. .......... 439/717 |
| 4,729,744 A | | 3/1988 | Bet et al. |
| 5,094,626 A | * | 3/1992 | Fabrizi et al. ............... 439/511 |

FOREIGN PATENT DOCUMENTS

| CA | 1109132 | 9/1981 |
| EP | 0 626 712 | 11/1994 |
| EP | 0 867 993 | 9/1998 |
| EP | 0 893 847 | 1/1999 |

* cited by examiner

Primary Examiner—Javaid H. Nasri
(74) Attorney, Agent, or Firm—Parkhurst & Wendel, L.L.P.

(57) ABSTRACT

An electric switch assembly including a multipolar quick-assembly appliance and a quick-connect appliance, wherein the body of an appliance, or its power terminal strip, is directly fixed and interlocked with to the body of an adjacent appliance. The interconnection between the various appliances is rapidly performed by multipolar blocks capable of being pressed on the front surfaces of appliances and being elastically plugged into their terminals.

11 Claims, 4 Drawing Sheets

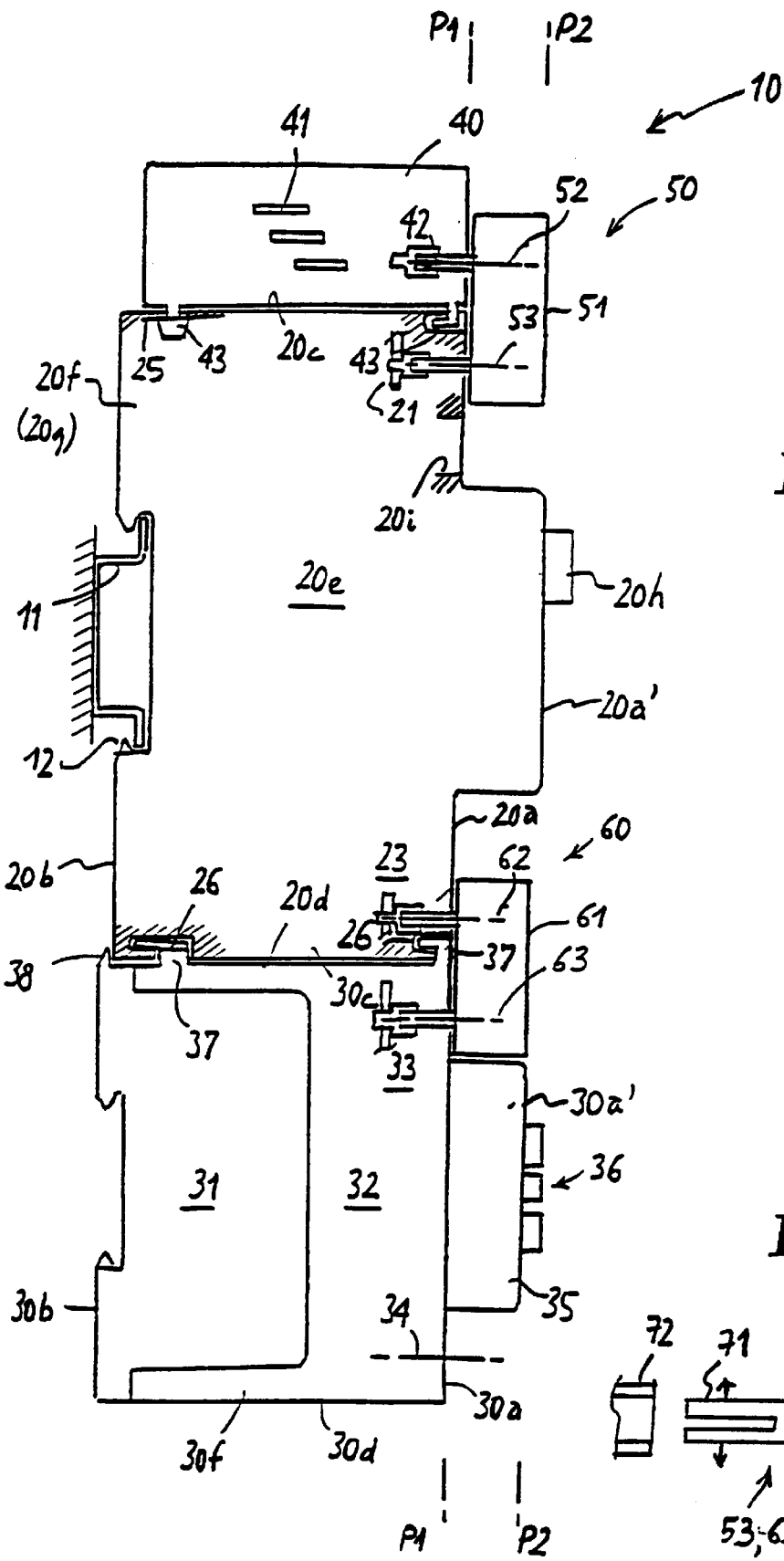

ELECTRIC SWITCH APPLIANCE AND QUICK-ASSEMBLY

TECHNICAL FIELD

The present invention relates to an electric switch assembly comprising two multipolar appliances, each of which comprises an external body provided with a front face, upper and lower transverse faces, side faces and a rear face notably for fixing to a support, wherein at least one of the appliances has breaker properties; the appliances have polar power links including internal power conductors housed in the body and upstream and/or downstream power connection terminals having apertures which open onto the front face for connecting external conductors to the power conductors.

BACKGROUND ART

Such a unite may notably be a so-called motor starter. The switching unit may be a contactor, a breaker, a disconnector or any another similar switch appliance which may be used in low voltage electricity distribution or control.

Such an appliance is described in document EP-0 869 594. Facilitating its mechanical assembly is desirable and it is further desirable that the operator may assemble and wire up a motor starter appliance, or more generally a set of electric switch appliances, manually, i.e. without having to resort to a tool.

SUMMARY THE INVENTION

The object of the present invention is to simplify the setting-up of an assembly of electric switch appliances, notably of a motor starter assembly, and to provide easy assembly and quick wiring up and as far as possible without having to resort to a tool.

According to the invention, in an assembly of the described type, coupling means are provided for maintaining both appliances mechanically coupled, a multipolar interconnection block is applied on at least one of the front faces of the coupled appliances, and it includes plugged pins in the power terminals facing the matching poles of the appliances in order to provide the respective polar links between the appliances, and the pins of the block and the power connection terminals facing each other cooperate by means of a resilient effect.

The coupling means may be a common base or a fastening part, but they are preferably provided on the bodies of the appliances in order to ensure direct coupling of the bodies. The connection terminals are preferably laid out so as to enable cables to be connected with a tool and pins to be connected without a tool; they may also be of the tulip-shaped type with radial clamping. In this way, the electric power link between the appliances takes place, after their coupling without any intermediate part (preferably by fastening them together) by engaging a interconnection multipolar block with pins, and this without requiring any tool.

It is advantageous when the coupling means comprise fitting means with protrusions or slots provided on an upper or lower face of a specific power terminal strip forming the upper or lower face of the body of an appliance either partly or entirely. The relevant appliance may thus be manufactured in a standard version with screw terminals, easily adaptable to the described coupling by simply adding a power terminal strip with resilient or tulip-shaped terminals. Interlocking means also enable the casing of the contactor to be directly and securely fixed to the casing of the breaker.

BRIEF DESCRIPTION OF THE DRAWINGS

The description of a non-limiting embodiment of the invention will be made hereafter with reference to the appended drawings.

FIG. 5 shows an alternative of the assembly according to the invention.

FIG. 6 illustrates a detail of the power connection for the assembly of FIG. 5.

DESCRIPTION OF THE INVENTION

Figure 1:
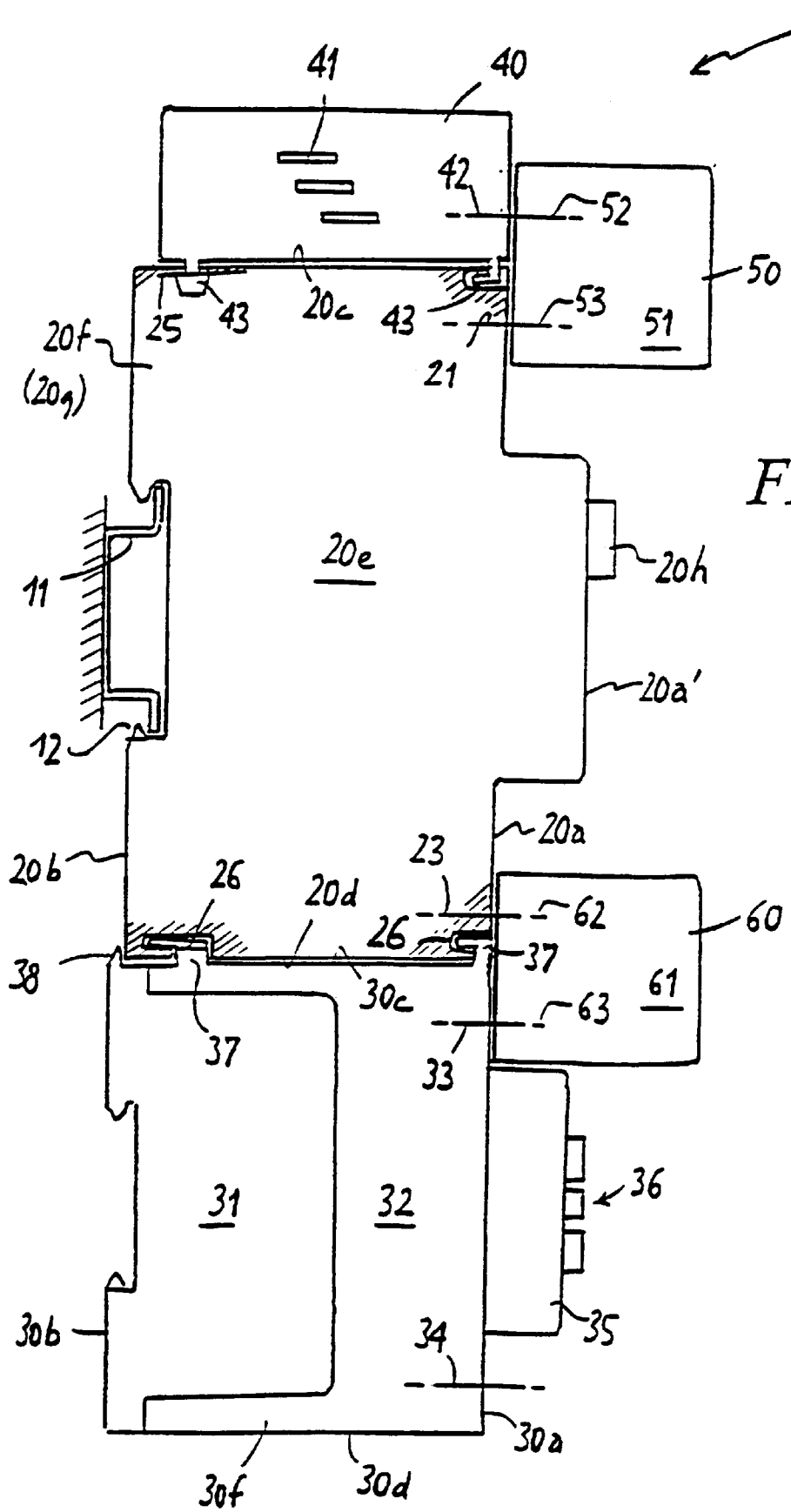
FIG. 1 illustrates a side view of a motor starter assembly according to the invention.
Figure 2:
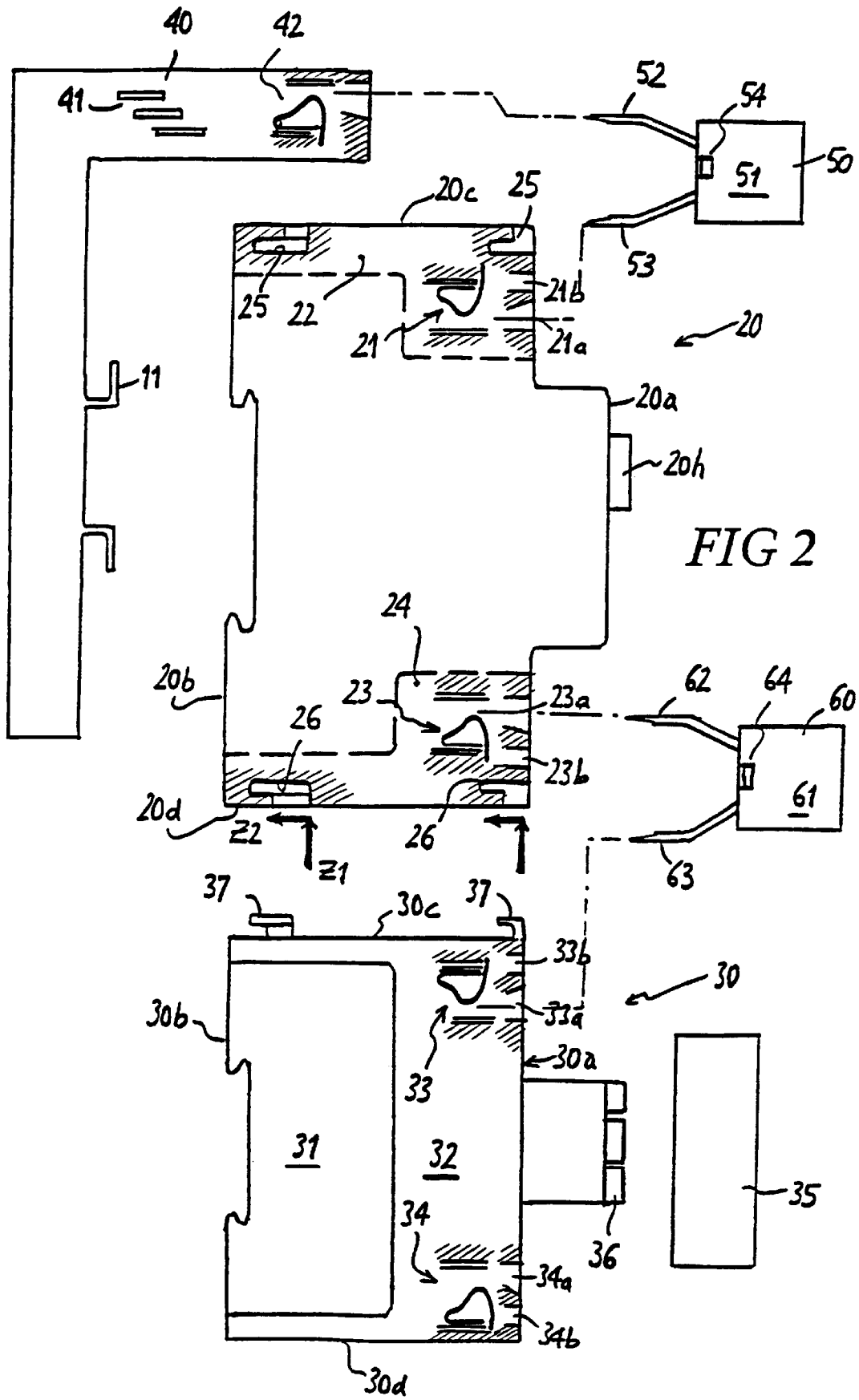
FIG. 2 shows the motor starter assembly with its different components in an exploded view, with a power supply alternative.
Figure 3:
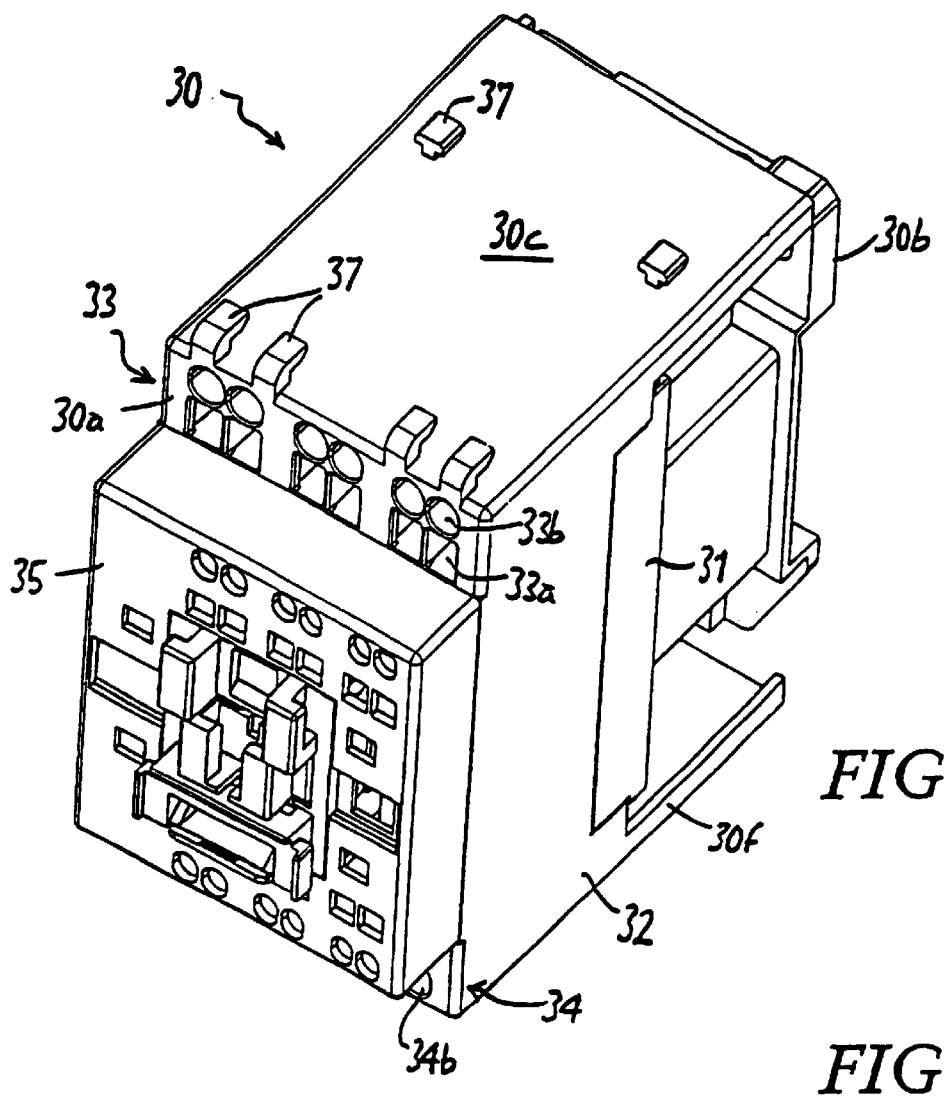
FIG. 3 is a perspective view of the contactor.

The motor starter assembly 10 illustrated in FIGS. 1 and 2, comprises a mechanically coupled breaker 20, and contactor 30. The assembly is fixed to a rear support 11 such as a rail or another support via usual fixing means 12, notably interlocking means, provided at the rear of the breaker, whereas the contactor 30 is directly fixed to the breaker 20 below the latter. The terms front, rear, upper and lower are assigned to components of the assembly according, to the normal mounting of this assembly and to its servicing by an operator, who would be located on the right of FIGS. 1 and 2.

The breaker 20 has a front face 20a located in a plane P1, a rear face 20b, upper and lower faces 20c, 20d and side faces 20e and similarly the contactor has a front face 30a, for example also located in plane P1, as well as a rear face 30b, upper and lower faces 30c, 30d and side faces 30e. In this embodiment, the breaker has power terminals with resilient clamping, hereafter designated as "resilient terminals", i.e. upstream terminals 21 and downstream terminals 23 located near its front face. When the external body 20f of the breaker is formed by its actual casing 20g (FIG. 1), terminals 21, 23 are housed in this casing; when the external body 20f of the breaker is partly formed by the casing and partly by the respective upstream 22 and downstream 24 terminal strips fixed on the upper and lower portions of the casing (FIG. 2), terminals 21, 23 are then housed in the terminal strips. Usual on/off buttons 20h or other dialog components are positioned on a portion 20a' of the front face 20a if the breaker, protruding forwards with respect to the remainder of face 20a, in order to act on a mechanism which interrupts the internal current links connected to the aforementioned terminals. An aperture 20i is provided in face 20a above the upstream terminals 21 in order to house a signalling addition not shown.

Figure 4:
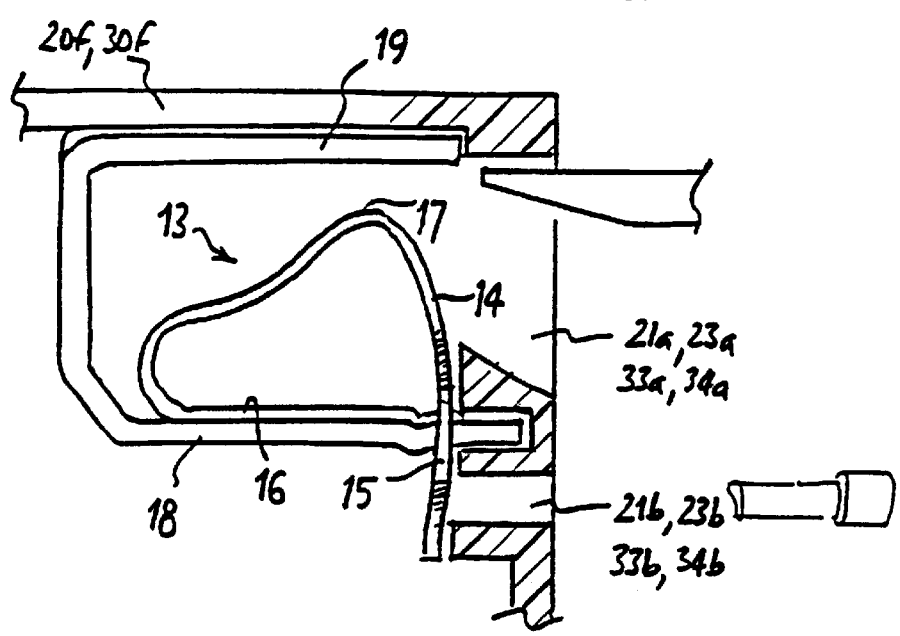
FIG. 4 shows a resilient terminal used in the components of the motor starter assembly.

Each terminal 21, 23 of the breaker comprises a resilient cage 13 of a known type (see FIG. 4) having a clamping lead 14 provided with an aperture 15 for clamping a cable by jamming it, a lead 16 applied on a conducting support 18 and a loop with a convex back portion 17 connecting leads 14, 16. A cable may be introduced into the aperture 15 after loosening the cage by exerting pressure with a tool on loop 17; a pin, in the present case an interconnection pin, between both appliances may be put into contact, without any tool, with a conducting part 19 by direct pressure on loop 17; this part 19 is positioned in parallel to lead 16 opposite the cage.

Each terminal 21, 23 of the breaker is thus laid out so that a cable may be connected with a tool and an interconnection pin may be connected without a tool. The terminal housing opens onto the front face 20a through a passage 21a, 23a for introducing a cable to be jammed in the aperture 15 and through a passage 21b, 23b for introducing either a tool capable of loosening the terminal by pressure on the loop, or an interconnection pin, as described later. Power supply of the terminals 21 is provided by a set 40 of power conductors, notably bars, placed and fixed on the upper face 20c of the breaker. The set of bars 40 comprises distribution bars 41 and terminals, each of which is connected to one of the bars. In the embodiment of FIG. 1, the set of bars 40 includes protrusions 43, for example studs or projections with a suitable profile, for cooperating with the fitting slots or button holes 25 provided as the case may be, in the upper face 20c of the casing 20g or of the upstream terminal strip 22 for anchoring the set of bars 40 to the breaker 20. Alternatively, the upstream appliance fitted on the breaker may be a disconnector or limiter. In the embodiment of FIG. 2, the set of bars 40 includes the rear support 11 of the breaker and does not need to be fitted onto the face 20c of the breaker.

A power interconnection multipolar block 50 is provided for ensuring the power supply of the breaker. It includes an insulating body 51 and upstream 52 and downstream 53 pins to be plugged into the respective resilient terminals 42, 21 of the set of bars and of the breaker. A retaining unit 54 ensures blocking of the block against the breaker or the set of bars in order to prevent any untimely unfastening.

The casing 20g of the breaker or its downstream terminal strip 24 has slots 26, certain of which assuming the shape of button holes, provided on the lower face 20d, for cooperating as it will be seen with complementary shapes of the contactor in order to ensure direct fixing of the latter to the breaker.

The contactor 30 provides a structure such that its external body 30f is substantially formed by an arc casing 31 which houses fixed and mobile contacts and by a power terminal strip 32 fixed to the arc casing. Power terminal strip 32 houses upstream resilient terminals 33 and downstream resilient terminals 34 provided with cages 13 similar to those of the breaker.

The resilient terminals 33, 34 of the contactor are similar to those 21, 23 of the breaker. They open onto the upper face 30a of the body 30f through passages 33a, 34a for engaging an interconnection pin and through a passage 33b, 34b for engaging a cable to be connected in the jamming aperture 15 of the resilient cage. When an interconnection pin is used, passage 33b, 34b is not used. When a cable is used, passage 33a, 34a is used for introducing a tool which forces the loosening of the cage.

Of course, instead of a monoblock terminal strip, it is possible to design two upstream and downstream distinct terminal strips as inserts on the arc casing 31. A monitoring and control terminal strip 35 which houses resilient terminals for connection with the coil and with the signalling units, is fixed on the front side of the power terminal strip in order to let fixing and maneuvering projections 36 through from an optional added block. The terminal strip forms the main part of the contactor's upper face 30c and lower face 30d, and comprises at least on the upper face, protrusions 37 for cooperating with the lower fitting slots 26 of the breaker 20. It should be noted that the face 20a' of the body of the breaker and the front face 30a' of the terminal strip 35 of the contactor are in a same parallel plane P2, and jutting out with respect to P1.

The movement for engaging the contactor is performed by a first move Z1 for example parallel to the front faces 20a, 30a of both appliances, and then by a second move Z2 perpendicularly to these faces. A retaining component 38, notably an interlocking component, provided on the upper or rear face of the contactor, ensures its blocking against any pulling out forward movement when it is fastened to the breaker. Resilient loosening means preferably by manual maneuvering, are associated with component 38 for clearing it, in order to release the contactor from the breaker.

Each terminal 33, 34 opens onto the front face 30a of the contactor through a passage 33a, 34a for a cable to be connected in the aperture 15 of the jamming lead of the resilient cage and a passage 33b, 34b for a loosening tool, or for an interconnection pin with the breaker.

A power interconnection multipolar block 60, preferably identical to block 50, includes an insulating body 61, upstream 62 and downstream 63 pins and a retaining component 64. The pins are for plugging into the breaker's downstream resilient terminals 23 without any tool and the contactor's upstream resilient terminals 33 and the retaining component 64 prevents any untimely pulling out of the block. Another block may be provided for connecting the contactor to the load.

The mounting of the motor starter assembly 10 will be described with reference to FIG. 2. The breaker is fixed on its support 11 forming part of the set of bars 40, and then the contactor is fitted in under the breaker, in order for it to be coupled with the latter in a well determined position, and the pins of the interconnection blocks 60 are plugged into the power resilient terminals 23, 33 while being maintained in the plugged position by their retaining component 64. Supplying power to the whole is achieved by inserting pins of the interconnection blocks 50 into the terminals 21 of the breaker and 42 of the set of bars. It should be noted that the mounting and the dismounting of the assembly are performed without requiring any tool.

Of course, several assemblies 10 may be juxtaposed by affixing the side faces 20e, 30e of their different contactor-breaker pairs. The contactor, here of the electromechanical type, may be of the static type. Further, the contactor may be provided on its lower face 30d with fitting protrusions or slots for bearing an additional or communications module or more generally, an auxiliary appliance to be quickly assembled and connected. It is a matter of fact that the fitting protrusions and slots provided on both of these appliances may be reversed.

In the embodiment of FIG. 5, the multipolar blocks 50, 60 have pins 52, 53, 62, 63, the ends of which 71 have a resilient configuration, in particular in the radial direction as indicated in FIG. 6. The matching terminals 42, 21, 23, 33 of the appliances have stiff sockets 72 formed by the portions of conducting parts such as 19 or by auxiliary parts fixed onto these conducting parts. Placing of the blocks 50, 60 is again performed by a perpendicular movement to the front faces 20a, 30a of the appliances. Alternatively, the sockets may be resilient tulips cooperating with rigid stiff pins.

It should be noted that the upstream multipolar interconnection block 50 has a height such that the aperture 20i dedicated to the introduction of an addition into the body 20f of the breaker is left clear, and that the multipolar interconnection blocks 50, 60 are quasi embedded, with a depth such that their front face is substantially aligned with plane P2 of the dialog and monitoring faces of the appliances.

What is claimed is:

1. An electric switch assembly comprising:
   two multipolar appliances, each comprising an external body having a front face, with upper and lower transverse faces, side faces and a rear face for fixing to a support, at least one of the appliances having breaker properties;

polar power links comprising internal power conductors housed in the body and upstream and/or downstream power connection terminals having apertures that open onto the front face for connecting external conductors to the power conductors, wherein:

coupling means are located for mechanically coupling both appliances together, a multipolar interconnection block is attached to at least one of the front faces of the coupled appliances and comprises pins plugged into power terminals facing the matching poles for ensuring respective polar links between the appliances, the pins of the block and the power connection terminals facing each other to cooperate by a resilient effect, and a power terminal strip comprising the power terminals is fixed to the external body of at least one of the appliances for partly or entirely forming, by its upper or lower face, the upper or lower transverse face of the at least one of the appliances, and the coupling means comprise fitting means with protrusions or slots located on an upper or lower face of the power terminal strip.

2. The electric assembly according to claim 1, wherein the power connection terminals are located to enable cables to be connected with a tool and pins to be connected without any tool.

3. The electric assembly according to claim 1, wherein the power connection terminals and/or the pins of the multipolar block are of a socket and radial clamping type.

4. The electric assembly according to claim 1, wherein the coupling means are located on the bodies of the appliances and located to enable the appliances to be directly fastened by mutual displacement perpendicularly to their front faces.

5. The electric assembly according to claim 1, wherein the multipolar interconnection blocks have a depth such that their front face is substantially aligned with the plane of the dialog and monitoring projections of the appliances.

6. The electric assembly according to claim 1, wherein the coupling means comprise means for directly interlocking the body of one appliance on the body of the other appliance, the coupling means for preventing unintended decoupling.

7. The electric assembly according to claim 1, wherein the upstream multipolar interconnection block has a height such that an aperture is left clear for introducing an addition into the body of the breaker.

8. An assembly comprising two superimposed switch appliances, each having an external body with a front face located thereon, a rear face, upper and lower transverse faces and side faces, and means for fixing one of the appliances to a rear support, wherein:

one of the appliances comprises a power terminal strip as an insert on an external body and terminals located close to and opening onto the front face of the external body through passages for connection, the power terminal strip comprises upper and lower power terminal strip portions, wherein the lower appliance is directly fastened to the upper appliance by the lower power terminal strip portion located on the upper plane face of the lower appliance, with first protrusions or slots for fitting into second protrusions or slots of a first complementary shape located on the lower face of the upper appliance, and the upper appliance is directly fastened to the lower appliance by the upper power terminal strip portion located on the lower plane face of the upper appliance, with third protrusions or slots for fitting into fourth protrusions or slots of a second complementary shape located on the upper face of the lower appliance.

9. The assembly according to claim 8, wherein the appliances have resilient terminals and the connection between the resilient terminals of the appliances comprises a multipolar interconnection part with pairs of stiff pins for penetrating into the resilient terminals.

10. The assembly according to claim 9, wherein the multipolar interconnection block is for engagement and establishing contact, without any tool, in the resilient terminals of both appliances, wherein said both appliances have connections for connection to cables with a tool and for connection to pins without a tool.

11. The assembly according to claim 8, wherein both appliances have terminals with a tulip, and the connection between the terminals of both appliances comprises a multipolar interconnection block with pairs of resilient pins for penetrating into the terminals through the resilient ends.

* * * * *